XR 3,657,473

United State[s] Corcoran

[15] 3,657,473
[45] Apr. 18, 1972

[54] HOLOGRAPHIC IMAGE RECORDING AND REPRODUCING SYSTEM

[72] Inventor: John W. Corcoran, Los Altos, Calif.
[73] Assignee: Zenith Radio Corporation, Chicago, Ill.
[22] Filed: May 15, 1970
[21] Appl. No.: 37,555

[52] U.S. Cl. ............................................178/6.7 A, 350/3.5
[51] Int. Cl. .................G02b 21/18, G02b 27/10, H04n 5/84
[58] Field of Search ..........................178/6.7, 6.7 A; 350/3.5

[56] References Cited

UNITED STATES PATENTS

| | | | |
|---|---|---|---|
| 3,573,362 | 4/1971 | Burchardt | 178/6.7 A |
| 3,534,166 | 10/1970 | Korpel | 178/6.7 A |
| 3,501,216 | 3/1970 | Kogelnik | 178/6.7 A |
| 3,501,587 | 3/1970 | Herriott | 178/6.7 A |

*Primary Examiner*—Howard W. Britton
*Attorney*—John J. Pederson

[57] ABSTRACT

A holographic image recording and reproducing system for use with a conventional television receiver. A laser beam which is intensity modulated in accordance with video information is projected through a Bragg cell deflection system to provide a scanning image beam. The undiffracted output beam from the Bragg diffraction scanning system is employed as the reference beam. The reference beam and the scanning signal beam are converged by an optical lens system at a Fourier transform plane where a light responsive film is transported. Image data from an entire horizontal scanning line of the TV image is overlapped to provide a single holographic image, and a separate deflection mirror or other deflecting system is provided to sweep the scanning signal beam and the reference beam, still converged, slowly across the width of the even more slowly moving film. For playback, the reference beam component is removed, the film is swept by an unmodulated scanning signal beam following the same scanning pattern as the original recording signal beam, and a photodetector is positioned on a projection of the path of the original reference beam to reconstruct the television signal for playback through the TV receiver.

10 Claims, 1 Drawing Figure

3657473
NO OR CLASSIF

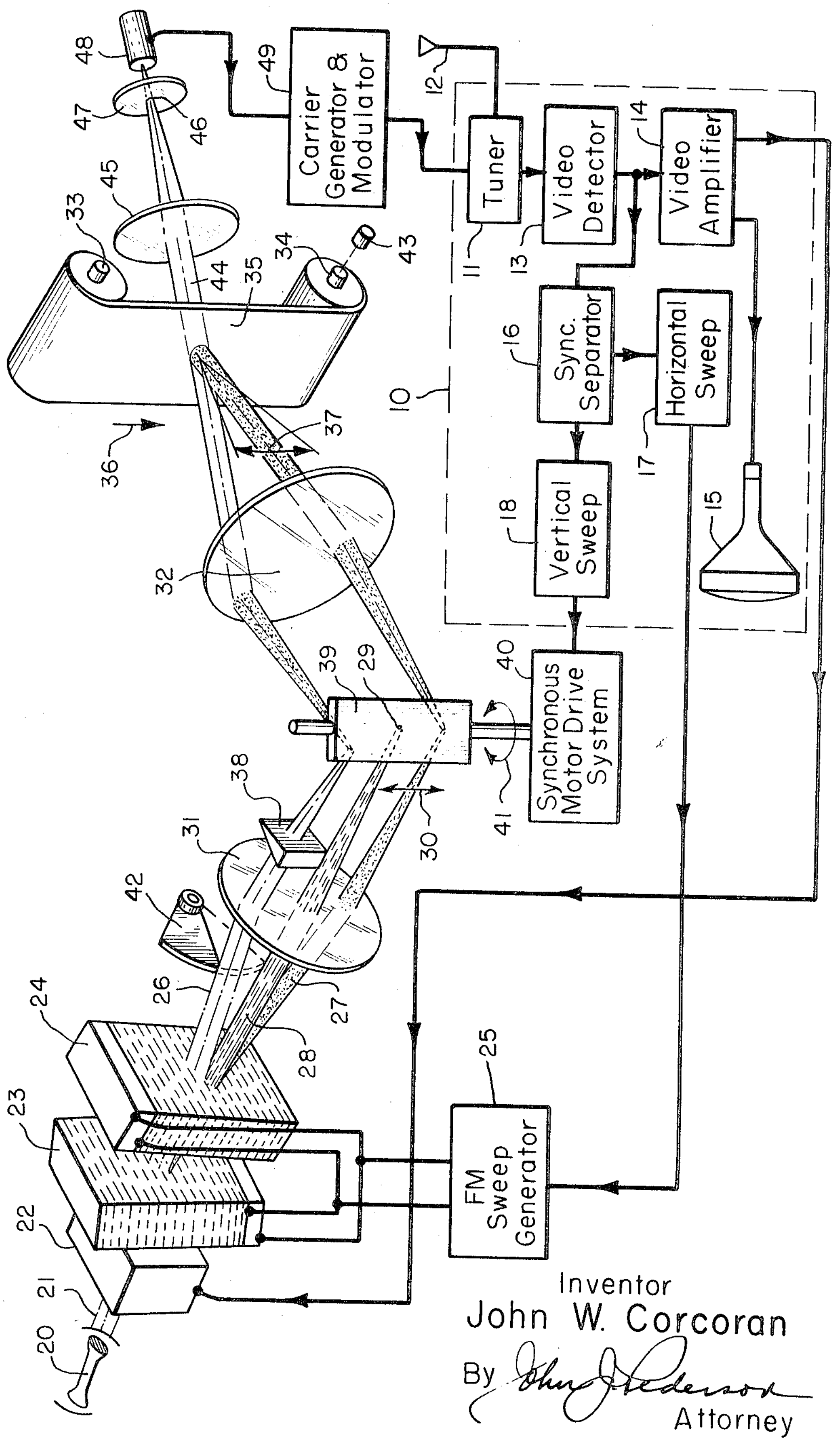
Inventor
John W. Corcoran
By [signature]
Attorney

HOLOGRAPHIC IMAGE RECORDING AND REPRODUCING SYSTEM

BACKGROUND OF THE INVENTION

This invention relates to television image recording and reproducing systems and more particularly to such systems for use in conjunction with conventional television receivers and the like.

Various systems have been proposed for video recording of television signals and for subsequent playback of such recorded signals in the home. Recording of television images on film has the potential of possessing very substantial economic advantages over magnetic tape as a recording medium in such systems. Modern films have a high resolution capability or information packing density in the order of 400 lines per millimeter, and if this could be fully utilized, a consumer cost as low as $3.00 to $5.00 per hour for the recording medium could be realized compared with $40.00 an hour or more for magnetic tape. To make use of such high resolution however, effective measures must be taken to overcome the effect of dirt and scratches in wiping out stored information. Also, with equipment using conventional photographic imaging techniques, extreme manufacturing tolerances of the order of 0.0001 inch must be maintained to provide necessary registration, depth of focus, and synchronization of television and film transport in the playback mode; such extreme tolerances are not compatible with mass production techniques required to achieve a commercially practical television recording and playback system for the home.

It is a primary object of the present invention to provide a new and improved television image recording system.

Another object of the invention is to provide a new and improved image recording system suitable for television image recording and playback through a conventional television receiver, at an equipment cost compatible with large scale use in home entertainment equipment.

Still another object of the invention is to provide a new and improved television image recording and playback system using the high resolution capability of photographic film without requiring such extremely accurate manufacturing tolerances as to render the required equipment too expensive for widespread commercial use in the home.

Yet another object of the invention is to provide a new and improved image recording and reproducing system using photographic film as the recording medium while minimizing the effect of dirt and scratches in wiping out stored information, and overcoming the need for extreme accuracy in manufacturing tolerances with a minimum sacrifice in signal-to-noise ration or contrast.

SUMMARY OF THE INVENTION

In accordance with the invention, a new and improved holographic image recording system comprises means for projecting a coherent light beam, and means for deriving from the light beam spatially separate reference beam and signal beam components and for causing repetitive scanning of the signal beam component in a predetermined scanning plane. Means including an optical lens system having an optical aperture sufficiently large to receive both the signal and reference beam components are provided for converging the beam components at a Fourier transform plane. Means including a light beam deflecting element are provided for laterally deflecting both the signal and reference beam components in a predetermined direction relative to the scanning plane while maintaining their convergence at the Fourier transform plane. Means are provided for transporting a light-responsive film in the Fourier transform plane in a direction transverse to the predetermined direction.

A holographic image translating system in accordance with the invention comprises means for transporting a film recording of sequential strips of individual multiple-image holograms in a direction transverse to the strips, means for sequentially illuminating the holograms with a repetitively scanning coherent light beam, and means comprising a photodetector centered on a predetermined axis for reading the holograms to develop a video signal.

In accordance with another aspect of the invention, a holographic image translating system comprises means for producing a pair of spatially separated coherent light beams and for repetitively scanning one of the beams back and forth in a predetermined scanning plane, together with means for converging the scanning beam and the other beam while maintaining the other beam direction at an acute angle with respect to the scanning plane.

The features of the present invention which are believed to be novel are set forth with particularity in the appended claims. The invention, together with further objects and advantages thereof, may best be understood by reference to the following description taken in connection with the accompanying drawing, in the single figure of which like reference numerals identify like elements, and in which the single FIGURE is a schematic diagram, partly in perspective, of a holographic image recording and reproducing system embodying the present invention.

DESCRIPTION OF THE PREFERRED EMBODIMENT

The single FIGURE of the drawing shows a holographic image recording and reproducing system in accordance with the invention, as associated with a conventional television receiver. The television receiver is indicated within the dashed outline 10 and includes a tuner 11 for receiving broadcast television signals by way of an antenna 12. The output signal from tuner 11 is demodulated by video detector 13, amplified by video amplifier 14, and applied to a cathode-ray tube 15 to reproduce the television image on its viewing screen. Synchronizing signals are separated from the composite video signal by a sync separator 16 which drives horizontal and vertical sweep systems 17 and 18, respectively, to control the scansion of the electron beam in cathode-ray tube 15. The receiver 10 may be entirely conventional.

The holographic image recording and reproducing system of the present invention comprises a laser 20 for projecting a coherent monochromatic light beam 21. Light beam 21 is modulated in intensity by a light valve 22 which may for example be a light-sound interaction cell such as a Bragg cell or a DeBye-Sears cell, or an electro-optic device much as a KDP or a YIG modulator. The intensity modulated light beam from light valve 22 is projected through a scanner which preferably comprises two Bragg diffraction cells 23 and 24 which are arranged in tandem along the path of the light beam and operated with a common driving signal from an FM sweep signal source 25 synchronized by the horizontal sweep system 17 of television receiver 10. Bragg cells 23 and 24 are disposed to project sound wave fronts across the path of the light beam 21 in opposite directions, so that the net change in optical frequency of the scanning output beam is minimized because one of the Bragg cells up-converts and the other down-converts in frequency.

The zero order or undiffracted component of the output light from scanning system 23, 24 is employed as the reference beam 26 while the doubly diffracted first order output beam 27, having been diffracted by both cells 23 and 24, is employed as the subject or signal beam for use in the holographic recording process. The first diffraction order output from the first scanning cell 24 is of course separated into two components, of which the undiffracted component 28 is later discarded; this is most conveniently done by intercepting the undesired beam component 28 with an opaque field stop 29 in the ensuing optical system to be described. Thus, the scanning system comprising tandem Bragg cells 23 and 24 causes repetitive scanning of image beam component 27 in a predetermined scanning plane which, in terms of the coordinate perspective axes of the drawing, is the vertical plane containing the principal axis of the beam.

The reference beam 26 and the vertically scanning signal beam component 27 (which is synchronized by the horizontal sweep system 17 in the television receiver 10) are demagnified by a telescope composed of optical lens elements 31 and 32 and are converged at a Fourier transform plane corresponding to the rear focus of exit lens 32. Means schematically indicated by rollers 33 and 34 are provided for transporting a light-responsive photographic film 35 within the Fourier transform plane in the direction indicated by arrow 36. The signal beam component 27 pivots or rotates during each line interval of the television image, as indicated by the arrow 37, but the area of film 35 which is illuminated during each line scanning interval remains essentially unchanged. The film moves in the direction indicated by arrow 36, but advances only about one/two-hundred fiftieth of a spot diameter during the entire interval during which a particular area of film is being exposed.

A prism 38 located near the rear focus of input lens 31 diverts or shifts the direction of the reference beam 26, and this causes the reference beam 26 to emerge from the output lens 32 and approach the film transport plane at an acute angle with respect to the scanning plane 37 of the signal beam component 27. This results in twisting the interference fringes of the hologram which is produced by the system, permitting the use of more symmetrical and hence more economical optical components.

To separate the video signals for successive scanning lines, the reference and signal beams are laterally deflected across the width of the film, transversely with respect to the scanning plane of the signal beam 27, while maintaining their convergence at the Fourier transform plane. This is accomplished by means including a vertical deflection mirror 39 driven by a synchronous motor drive system 40 which in turn is controlled by the vertical sweep system 18 of television receiver 10. Vertical deflection mirror 39 is pivoted back and forth as indicated schematically by arrows 41 and is preferably located at the front focal plane of exit lens 32 to minimize the size and cost of the other optical components. Since scanning mirror 39 is synchronized from the vertical sweep system 18 of the television receiver, which is normally operated at a field rate of 60 Hertz, while the subject beam component or signal beam component 27 is scanned at a rate controlled by the horizontal sweep system 17 which normally operates at a frequency of 15,750 Hertz, mirror 39 is driven cyclically at a rate which is slow relative to the repetitive scanning rate of the signal beam component. Film transporting means 33, 34 moves the film 35 at an even slower rate, it being necessary only to advance film 35 during each scanning field by a distance equal to or greater than the diameter of the light spot on the film. Field stop 29, described previously, may conveniently be formed as an opaque or non-reflecting area of mirror 39.

In operation, holographic images of all picture elements on each horizontal scanning line are overlapped on a common area of film 35. There is resulting loss in light output on reconstruction of the recorded image by a factor corresponding to the reciprocal of the number of overlapped picture elements, but this light loss is accompanied by an easing of the mechanical tolerance requirements by an order of magnitude, thus adapting the entire apparatus to large scale commercial production on an economical basis, while yet achieving an acceptable signal-to-noise ratio in the ultimate image reproduction. By forming individual multi-image holograms of each scanning line component of the television image and recording these holograms in a two-dimensional raster on film 35, optimum film economy is achieved. The effect of dirt and scratches is also minimized by the use of holographic techniques.

Thus, in the recording process, film 35 is sequentially exposed to a series of strip holograms, each composed of a series of multiple-image holograms each containing all of the several hundred picture elements of an entire line scanning component of an image field. After exposure, the film 35 is developed in any conventional manner to produce a film transparency which may then be reloaded on reels 33, 34 for playback at any desired time.

Image reconstruction or playback is performed by the same optical system used in recording, but during playback the reference beam component 26 is blocked, as by rotating a normally open shutter 42 in the manner indicated in dotted outline. Shutter 42 of course is opened to the solid line position to permit reference beam component 26 to pass during the recording operation. In addition, during playback, no signal is impressed on modulator 22, so that the scanning signal beam component 27 is of constant intensity. Finally, for optimum performance, the film transport mechanism 33, 34 is properly phased by means of a vernier adjusting knob 43, for example, to provide precise tracking of the strip holograms on film 35 by the scanning signal beam component 27; in practice, as will be discussed hereinafter, one of the principal merits of the invention is that it permits the achievement of acceptable image reproduction without requiring such a phasing adjustment and without requiring the maintenance of impractically stringent manufacturing tolerances.

While holograms are conventionally reconstructed by illumination with a beam of coherent light which duplicates the direction and spread of the reference beam originally employed to make the hologram, it is well known that for any specific point of the image, the roles of reference beam and object or signal beam can be interchanged. Thus, re-illumination with a constant-intensity scanning beam component 27 regenerates a beam corresponding to a particular scanning line of the television image (by the spot location on the film) and a particular point on the scanning line (by the beam angle), which is projected as a stationary group of rays in a direction along the projected axis of the reference beam component. The output signal beam 44 is focused by an optical lens element 45 through a limiting aperture 46 of a stop element 47 and onto the light-responsive surface of a photodetector 48 which may constitute a simple photocell. Stop member 47 with limiting aperture 46 is situated at the focal plane of lens 45 so that limiting aperture 46 effectively separates the light intensity corresponding to the instantaneous point of interest from all the others. Thus photocell 48 responds sequentially to the individual multiple-image holograms each representing a scanning line component of the recorded image, to generate a conventional video signal. A carrier wave generator and modulator 49 receives the video signal output from photodetector 48 and converts it to a modulated RF carrier signal of a frequency corresponding to a vacant broadcasting channel frequency, and the vacant-channel-frequency signal is applied to the input terminals of tuner 11 of television receiver 10, for signal processing and image reproduction in the conventional manner.

Except for lenses 32 and 45, which must be of large aperture (e.g., $f/1.5$) and wide field (about 35 degrees) to properly form the holographic image and reconstruct the light beam, the optical elements employed in the system may be of simple and inexpensive construction. Even lenses 32 and 45 need not be high resolution elements, however, as only a small part of their aperture is used at any particular instant.

In a system in which recording capability is not required, intensity modulator 22 may be omitted and a field stop for the reference beam component 26 substituted for shutter 42. Such a playback-only type of system may be especially useful for example in connection with the reproduction of prerecorded holographic film transparencies.

Lens 31 may preferably be provided with a cylindrical optical component to compensate for the astigmatism introduced by the Bragg scanning cells.

Finally, the mechanical tolerances required with the system of the invention are significantly less stringent, by an order of magnitude at least, than those required of previous photographic film image recording and reproducing systems for use with television. This may be demonstrated by consideration of the four types of misregistration errors which may be presented, and their relative magnitudes in the system of the present invention as compared with the prior art systems. Assuming a light spot in the film plane of from 25 to 50 microns in diameter, it may be shown that a variance in film position in the direction 36 of film motion by 75 microns leads to a diminution of the intensity of the output video signal by only about 16 percent. For comparison, in an ordinary imaging system using unfused horizontal line scan at 400 lines per millimeter corresponding to the film resolution capability, a registration error of 0.4 micron, or approximately 190 times less, would cause the same error in output signal intensity. For the grossest kind of error, with the re-scan or playback beam centered half-way between the strip holograms corresponding to successive image fields, the output signal would be a composite of these giving a loss factor of two in vertical resolution but essentially no loss in horizontal resolution.

Lateral film misregistration, transverse to the direction 36 of film motion, causes a vertical shift in the television image amounting to two lines per thousandth of an inch. In this case, gross errors will cause signals from two successive horizontal lines to be merged on playback as in a fused picture. In conventional prior art systems, assuming a horizontal scan length of 1 millimeter for a standard image format, a lateral displacement of one one-thousandth of an inch with respect to the playback beam would cause a shift in the TV image of 2.5 percent of the frame width as compared with 0.4 percent of the frame height for the holographic system of the invention. This represents an improvement factor of six in required tolerances on lateral misregistration.

Motion of the film in the depth-of-focus direction has no effect on the fringe spacing or angular position since the beams are collimated. It does introduce a lateral shift in the beam position but this is very small and the overall effect is but a slight loss in output signal intensity. Angular tilting of the film plane relative to the direction 36 of film motion can cause a slight loss in horizontal resolution. Reasonable tolerances for planarity in this direction can be estimated from the fractional portion of the angular scan which represents one horizontal picture element dimension; this is about 0.1 °, an entirely reasonable and readily achievable tolerance.

Thus the present invention provides a holographic image recording and reproducing system specifically adapted for use in conjunction with a conventional television receiver. The system permits the use of photographic film as the recording medium, at much lower cost than magnetic tape for example, and takes advantage of the high resolution capability or information packing density of modern photographic film emulsions. Image degradation due to dirt or scratches is minimized, and acceptable image quality is achieved without requiring impractically stringent manufacturing tolerances.

While a particular embodiment of the invention has been shown and described, it will be understood that the various modifications or alterations may be made without departing from the true spirit and scope of the invention, and any such changes or modifications are intended to be contemplated within the scope of the appended claims.

I claim:

1. A holographic image recording system comprising:

means for projecting a coherent light beam;

means for deriving from said light beam spatially separate reference beam and signal beam components and for causing repetitive scanning of said signal beam component in a predetermined scanning plane;

means including an optical lens system having an optical aperture sufficiently large to receive both of said beam components for converging said beam components at a Fourier transform plane;

means including a light beam deflecting element for laterally deflecting both of said beam components in a predetermined direction relative to said scanning plane while maintaining their convergence at said Fourier transform plane;

and means for transporting a light-responsive film in said Fourier transform plane in a direction transverse to said predetermined direction.

2. A holographic image recording system according to claim 1, in which the image to be recorded is in television signal form, with the signal beam component being repetitively scanned at the line-scanning rate of said television signal, said light beam deflecting element is cyclically actuated at the field-scanning rate of said television signal, and said film transporting means moves said film at a rate which is slow relative to the field-scanning rate of said television signal.

3. A holographic image recording system according to claim 1, in which said means for converging said beam components at a Fourier transform plane comprises a demagnifying telescope.

4. A holographic image recording system according to claim 3, in which said light beam deflecting element comprises a scanning mirror located at the front focal plane of the exit lens of said demagnifying telescope.

5. A holographic image recording system according to claim 1, in which said light beam deflecting element comprises a scanning mirror driven cyclically at a rate which is slow relative to the repetitive scanning rate of said signal beam component.

6. A holographic image recording system according to claim 5, in which said film-transporting means moves said film at a rate slower than the lateral deflection rate of said converged reference beam and signal beam components.

7. A holographic image recording system according to claim 1, in which said means for deriving from said light beam spatially separate reference beam and signal beam components comprises Bragg diffraction light-sound interaction apparatus.

8. A holographic image recording system according to claim 2, in which said Bragg diffraction light-sound interaction apparatus comprises a pair of tandem Bragg diffraction cells operated with a common driving signal but disposed to project sound wave-fronts across the path of said light beam in opposite directions.

9. A holographic image recording system according to claim 3, in which the second Bragg diffraction cell is disposed to intercept the first-order output of the first Bragg diffraction cell at the Bragg angle to provide cumulative deflection therewith, and in which the zero-order output from the first Bragg diffraction cell proceeds undeflected through the second cell and is utilized as said reference beam component.

10. A holographic image recording and image playback system comprising:

means for projecting a coherent light beam;

means for deriving from said light beam spatially separate reference beam and signal beam components and for causing repetitive scanning of said signal beam component in a predetermined scanning plane;

means including an optical lens system having an optical aperture sufficiently large to receive both of said beam components for converging said beam components at a predetermined object plane;

means including a light beam deflecting element for laterally deflecting both of said beam components in a predetermined direction relative to said scanning plane while maintaining their convergence at said object plane;

means for transporting a photographic film in said object plane in a direction transverse to said predetermined direction;

means comprising a photodetector positioned on a predetermined axis corresponding to an extension of the path of said reference beam component beyond said object plane and responsive to a scanning light beam corresponding to said signal beam component for developing a video signal;

a television receiver for receiving broadcast television signals on any of a predetermined plurality of signal channels;

means coupled to said photodetector for converting said video signal to a modulated carrier type signal adapted to be impressed on said television receiver for translation therethrough on an unoccupied channel;

means coupled to the vertical sweep system of said television receiver for synchronizing said light beam deflecting element;

means coupled to the horizontal sweep system of said television receiver for synchronizing said repetitive scanning of said signal beam component;

and means coupled to the video amplifier of said television receiver for modulating the intensity of said signal beam component.

* * * * *